US009596512B2

(12) United States Patent
Garcia Navarro (10) Patent No.: US 9,596,512 B2
(45) Date of Patent: *Mar. 14, 2017

(54) APPARATUS, SYSTEMS AND METHODS FOR MEDIA CONTENT EVENT RECOMMENDATION BANNER

(71) Applicant: EchoStar Technologies L.L.C., Englewood, CO (US)

(72) Inventor: Carlos Garcia Navarro, Boulder, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/164,034

(22) Filed: May 25, 2016

(65) Prior Publication Data

US 2016/0269785 A1    Sep. 15, 2016

Related U.S. Application Data

(63) Continuation of application No. 14/527,415, filed on Oct. 29, 2014, now Pat. No. 9,357,266.

(51) Int. Cl.
*H04N 21/466* (2011.01)
*H04N 21/433* (2011.01)
(Continued)

(52) U.S. Cl.
CPC ......... *H04N 21/4668* (2013.01); *H04N 21/24* (2013.01); *H04N 21/422* (2013.01); *H04N 21/4221* (2013.01); *H04N 21/42204* (2013.01); *H04N 21/433* (2013.01); *H04N 21/4316* (2013.01); *H04N 21/442* (2013.01); *H04N 21/44204* (2013.01); *H04N 21/44213* (2013.01); *H04N 21/44222* (2013.01); *H04N 21/45* (2013.01); *H04N 21/454* (2013.01); *H04N 21/4532* (2013.01); *H04N 21/462* (2013.01); *H04N 21/466* (2013.01);
(Continued)

(58) Field of Classification Search
CPC ............... H04N 21/24; H04N 21/442; H04N 21/44204; H04N 21/44222; H04N 21/45; H04N 21/4532; H04N 21/454; H04N 21/466; H04N 21/4662; H04N 21/4667; H04N 21/4668; H04N 21/482; H04N 21/4886

See application file for complete search history.

(56) References Cited

U.S. PATENT DOCUMENTS 7,487,529 B1   2/2009   Orlick
8,392,940 B2   3/2013   Beyabani
(Continued)

OTHER PUBLICATIONS

Rovira, et al. "IndexTV: A MPEG-7 Based Personalized Recommendation System for Digital TV."

*Primary Examiner* — Justin Shepard
(74) *Attorney, Agent, or Firm* — Lowe Graham Jones PLLC (57) ABSTRACT

Systems and methods are operable to recommend media content events with a personalized user incentive. An exemplary embodiment generates a media content event recommendation banner that is concurrently presentable with a presented electronic program guide (EPG), wherein the media content event recommendation banner includes at least one identifier of a recommended media content event and at least one personalized user incentive that is configured to be selected by the user.

20 Claims, 5 Drawing Sheets

(51) Int. Cl.
　　　*H04N 21/431*　　(2011.01)
　　　*H04N 21/472*　　(2011.01)
　　　*H04N 21/482*　　(2011.01)
　　　*H04N 21/478*　　(2011.01)
　　　*H04N 21/8545*　(2011.01)
　　　*H04N 21/45*　　(2011.01)
　　　*H04N 21/442*　　(2011.01)
　　　*H04N 21/462*　　(2011.01)
　　　*H04N 21/422*　　(2011.01)
　　　*H04N 21/24*　　(2011.01)
　　　*H04N 21/488*　　(2011.01)
　　　*H04N 21/454*　　(2011.01)

(52) U.S. Cl.
　　　CPC ..... *H04N 21/4622* (2013.01); *H04N 21/4662* (2013.01); *H04N 21/4667* (2013.01); *H04N 21/478* (2013.01); *H04N 21/47208* (2013.01); *H04N 21/47211* (2013.01); *H04N 21/482* (2013.01); *H04N 21/4821* (2013.01); *H04N 21/4826* (2013.01); *H04N 21/4886* (2013.01); *H04N 21/8545* (2013.01)

(56) References Cited

U.S. PATENT DOCUMENTS

| | | |
|---|---|---|
| 8,544,039 B2 | 9/2013 | Chang et al. |
| 8,572,639 B2 | 10/2013 | Ficco |
| 8,739,221 B2 | 5/2014 | Silver et al. |
| 8,826,318 B2 | 9/2014 | Srinivasan et al. |
| 8,850,490 B1 | 9/2014 | Thomas et al. |
| 2002/0047926 A1 | 4/2002 | Kim |
| 2002/0166121 A1 | 11/2002 | Rovira |
| 2005/0086691 A1 | 4/2005 | Dudkiewicz et al. |
| 2005/0160458 A1 | 7/2005 | Baumgartner |
| 2010/0205636 A1 | 8/2010 | Coburn et al. |
| 2011/0167452 A1 | 7/2011 | Baumgartner et al. |
| 2012/0311633 A1 | 12/2012 | Mandrekar et al. |
| 2012/0331494 A1 | 12/2012 | Pontual et al. |
| 2013/0074109 A1 | 3/2013 | Skelton et al. |
| 2013/0198784 A1 | 8/2013 | Chane et al. |
| 2013/0205347 A1 | 8/2013 | Xu et al. |
| 2013/0283305 A1 | 10/2013 | Hirsch et al. |
| 2014/0047481 A1 | 2/2014 | Proehl et al. |
| 2015/0195624 A1 | 7/2015 | Gossweiler |

APPARATUS, SYSTEMS AND METHODS FOR MEDIA CONTENT EVENT RECOMMENDATION BANNER

PRIORITY CLAIM

This patent application is a Continuation of U.S. Non-Provisional patent application Ser. No. 14/527,415, filed Oct. 29, 2014, entitled "APPARATUS, SYSTEMS AND METHODS FOR MEDIA CONTENT EVENT RECOMMENDATION BANNER," published as U.S. Publication No. 2016/0127783 on May 5, 2016, issued as U.S. Pat. No. 9,357,266 on May 31, 2016, which is hereby incorporated herein by reference in its entirety.

BACKGROUND

Media devices, such as a set top box, a television, or the like, are often configured to present information pertaining to content availability using an electronic program guide (EPG). The EPG is a type of a user interface that presents a menu, or a series of menus, that describe available media content events that are available for presentation using the media device. The EPG has the look and feel of a table that uses a combination of text and/or symbols to indicate the media content event viewing choices that may be selected by the user. The media content event information presented on the EPG may include the title of an available media content event, the "channel" of the available media content event, the scheduled time and date of the media content event presentation, and optionally a brief description of the media content event. The EPG is interactive with the user. The user, by actuating one or more of the controllers on their remote control, is able to "scroll" or "navigate" about the EPG to select a media content event of interest for presentation and/or for recording.

Recent advances in the arts of providing enhanced information to users regarding available content is the development of content recommendations. Content recommendations identify media content events that may be of interest to a user. Content recommendations are determined based on specified user preferences, user viewing habits, and other information gathering techniques. However, merely identifying recommended media content events to a user may not be sufficient to motivate the user to access the recommended content.

Accordingly, there is a need in the arts to provide improved content recommendations to a user.

SUMMARY

Systems and methods of recommending media content events with a personalized user incentive are disclosed. An exemplary embodiment generates a media content event recommendation banner that is concurrently presentable with a presented electronic program guide (EPG), wherein the media content event recommendation banner includes at least one identifier of a recommended media content event and at least one personalized user incentive that is configured to be selected by the user.

BRIEF DESCRIPTION OF THE DRAWINGS

Preferred and alternative embodiments are described in detail below with reference to the following drawings.

DETAILED DESCRIPTION

Figure 1:
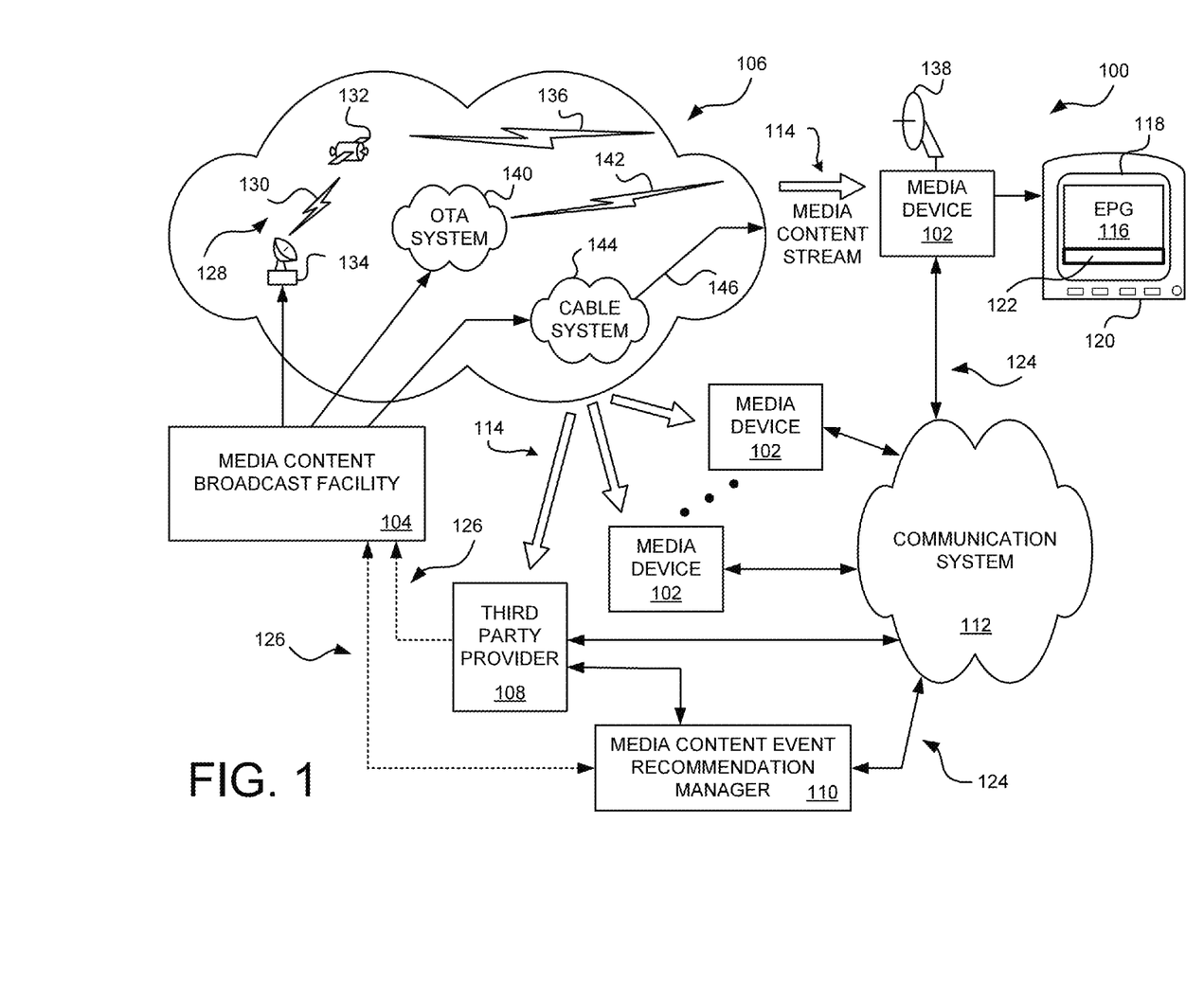
FIG. 1 is a block diagram of an example operating environment of a media content event recommendation system.

FIG. 1 is a block diagram of an example operating environment of a media content event recommendation system 100. The exemplary embodiment of the media content event recommendation system 100 is implemented in the exemplary operating environment that comprises a media device 102, a plurality of other media devices 102, a media content broadcast facility 104, a broadcast system 106, at least one third party provider 108, a media content event recommendation manager 110, and a communication system 112. The media devices 102 receive a media content stream 114 provided from the media content broadcast facility 104 over the broadcast system 106. The media content stream 114 is provided by a media content service provider and includes a plurality of serially presented media content events therein. An exemplary media device 102 includes, but is not limited to, a set top box (STB) that is communicatively coupled to the broadcast system 106. The media devices 102 are configured to present and/or store selected media content events that are received in the media content stream 114.

Embodiments of the media content event recommendation system 100 are configured to provide an enhancement to content recommendations presented to a user via their media device 102. When an electronic program guide (EPG) 116 is presented on a display 118 of media presentation device 120, a media content event recommendation banner 122 may be concurrently presented with the EPG 116. The media content event recommendation banner 122 is configured to provide one or more personalized user content recommendations and at least one personalized user incentive.

The media content event recommendation banner 122 is a portion of the display 118 that is used to present one or more media content recommendations. A different portion of the display 118 is used for presentation of the EPG 116. Alternatively, the media content event recommendation banner 122 may be a pop-up or other graphical artifact that is presented on top of a portion of the presented EPG 116. Preferably, one of a text color, text font, bordering, brightness level, contrast level, and/or background shading or color is different from that used by the EPG 116 so as to make the media content event recommendation banner 122 readily discernible to the user. Any suitable text color, text font, bordering, brightness level, contrast level, and/or background shading or color may be used for presentation of the media content event recommendation banner 122.

In an example embodiment, the personalized user incentive may be configured to permit the user to request the particular recommended media content event from the third party provider 108. Accordingly, the media content event recommendation banner 122 presents incentivized media content event recommendations such that the user is more likely to select the recommended media content event for presentation and/or recording using their media device 102.

Any suitable type of personalized user incentive may be included in a media content event recommendation banner 122.

In an example embodiment, recommended media content events are determined, defined, and/or identified by the media content event recommendation manager 110. Any suitable process of determining, identifying and/or selecting a recommended media content event based on user information (preferences, habits, and/or viewing history) may be used. Preferably, the recommended media content events are determined based on specified user preferences, user viewing habits, and other suitable information gathering techniques. The process of determining recommended media content events is ongoing, and different media content events are recommended as user information changes.

Further, recommended media content events are determined, identified and/or selected based on current availability of particular media content events. That is, any particular recommended media content event is be determined, identified and/or selected based on user information, and is also currently available to the user's media device 102 from at least one source.

For example, EPG information identifies media content events that are scheduled for current and/or for future presentation. Accordingly, one or more recommended media content events may be selected from the media content events currently identified in the EPG information (in addition with determining, identifying and/or selecting based on user information). As another example, recommended media content events may be currently available on a video on demand (VOD) system and/or from an Internet website or the like. Thus, a media content event may be identified as a recommended media content event when it is likely to be of interest to the user, and when the media content event is currently available to the user (or will at least be available to the user within some known period of time). In an example embodiment, the personalized user incentive indicates a price at which the user may gain access to the VOD media content event.

A third party provider 108 is a provider of content. Examples of third party providers 108 are website based content providers, premium channel providers, pay-per view content providers, and/or video on demand content providers. The third party provider 108 may provide single media content events. Alternatively, or additionally, the third party provider 108 may provide a service that includes a plurality of media content events that may be available on one or more particular "channels" of the media content stream 114. Typically, access to the media content event or channels is provided to the user of a particular media device 102 for a premium price.

As another example, a VOD system managed by a third party provider 108 may have many media content events available for delivery to a media device 102. Access to particular ones of the available VOD media content events may be free, and access to other media content events may be on a pay-for-view basis or subscription basis. Accordingly, one or more recommended media content events may be selected from the media content events that are currently available from the VOD system. If the recommended media content event is a premium media content event provided by a particular third party provider 108, one or more personalized user incentives to access the VOD media content event are indicated in the media content event recommendation banner 122. If the recommended media content event is a free media content event, one or more personalized user incentives to access other services and/or media content events may be indicated in the media content event recommendation banner 122.

Alternatively, or additionally, a website or the like may have media content events that may be delivered to the media devices 102. Accordingly, one or more recommended media content events may be selected from the media content events available from the website. When the recommended media content event is provided from a particular website of a third party provider 108, one or more personalized user incentives for the user to access the website are indicated in the media content event recommendation banner 122.

Depending upon the environment of the particular broadcast system 106 that provides content to the media devices 102, a selected recommended media content event may be communicated to the requesting media device 102 in a variety of manners. In an example environment, the third party provider 108 may be a website or the like that provides content via the Internet (which is a portion of the communication system 112). The third party provider 108 may then provide a requested recommended media content event to a particular media device 102 via a communication link 124 that has been established between the third party provider 108 and the media device 102.

Alternatively, or additionally, the third party provider 108 may provide the requested recommended media content event to the media content broadcast facility 104 via a communication link 126. For example, the third party provider 108 may be a premium service content provider that provides VOD content. The media content broadcast facility 104 then provides the recommended media content event to the particular media device 102 in the media content stream 114.

Alternatively, or additionally, the recommended media content event may already be available in the media content stream 114. For example, the third party provider 108 may be a premium service content provider that provides one or more channels of premium content. Here, the third party provider 108 indicates to the media content broadcast facility 104 that a particular media device 102 is now authorized to access the content, such as a particular premium channel or the like. Alternatively, or additionally, the third party provider 108 may provide access information, such as a security code, authorization, password, or the like, that is communicated to the media device 102 so that the media device 102 may then access the premium service channels having the selected recommended media content event.

In the example embodiment of FIG. 1, the media content event recommendation manager 110 is illustrated as an electronic device that is communicatively coupled to the media devices 102, via a communication link 124. Thus, the communication link 124 spans a portion of the communication system 112. In alternative embodiments, the media content event recommendation manager 110 may be implemented within one or more of the media devices 102.

Determination of a particular personalized user incentive that is presented in the media content event recommendation banner 122 is coordinated by the media content event recommendation manager 110 with the one or more third party providers 108. In the various embodiments, one or more recommended media content events are identified by the media content event recommendation manager 110. In addition to identifying particular recommended media content events, the media content event recommendation manager 110 also determines access rights that the user currently has for each particular recommended media content event.

Access rights may be based on the user's account information and/or the user's identity (or the identity of the media device 102 of that particular user).

If the media content event recommendation manager 110 determines that a particular user does not have current access rights to a particular recommended media content event, the media content event recommendation manager 110 identifies one or more personalized user incentives that may be offered to that particular user. Alternatively, if the particular user does have current access rights to a particular recommended media content event, the media content event recommendation manager 110 identifies one or more personalized user incentives that may be offered to that particular user, such as access to the recommended media content event at a reduced price.

For example, an introductory price for a service provided by the third party provider 108 may be included in the media content event recommendation banner 122 as an personalized user incentive. If the user agrees to purchase the selected recommended media content event, and/or agrees to purchase another product, service and/or media content event, then the selected recommended media content event (and/or access rights thereto) is then communicated to the user's media device 102. In some embodiments, the recommended media content event may already be stored at the media device 102 such that access information is then provided to the media device 102.

In an example embodiment, the media content event recommendation manager 110 identifies or determines a personalized user incentive by requesting incentive information from the particular third party provider 108 that provides a particular recommended media content event that is to be identified in a media content event recommendation banner 122. Based on the incentive information provided by the third party provider 108, a personalized user incentive for that particular user may be identified or determined.

The incentive information provided by the third party provider 108 may be equally applicable to all users of the media devices 102. For example, a special "rental" price for a particular identified media content event may be offered by the third party provider 108 to any user.

Alternatively, or additionally, since particular users may be uniquely identified by the media content event recommendation manager 110 and/or by the third party provider 108, particular users may be offered a specific personalized user incentive based on some aspect of that identified user, such as their current business relationship with the third party provider 108. For example, new customers (users not currently doing business with that particular third party provider 108) may be offered a one-time incentive, such as a free trial offer period for a service provided by the third party provider 108.

As another example, the indicated recommended media content event may be offered for free to a new customer user or to an existing customer user in exchange for the user purchasing a reduced introductory rate for a new and/or a currently unsubscribed service provided by the third party provider 108. To illustrate, the third party provider 108 may provide one or more premium channels and may separately provide selected pay-for-view media content events. The personalized user incentive for an existing customer user to purchase a recommended pay-for-view media content event may be included in the media content event recommendation banner 122. On the other hand, the personalized user incentive for a new customer user may be different from incentives offered to existing customer users. Lower prices and/or additional services may be offered to a new customer user.

Accordingly, the media content event recommendation banner 122 may be further customized based on the user's personal viewing habits, history, and/or account information in addition to their current business relationship with the third party provider 108.

As yet another example, the personalized user incentive may be for a special price for bundled content that includes the user selected recommended media content event. To illustrate, the recommended media content event may be for a particular sporting event such as a football game, soccer match, or the like that is expected to be of interest to the user. The personalized user incentive may be to purchase a "season pass" or the like for a grouping of like or related sporting events that includes the particular sporting event indicated on the media content event recommendation banner 122. Here, user preferences, habits, and/or viewing history may indicate that this particular user is only interested in one type of sporting event. Accordingly, the bundled personalized user incentive could be limited to accessing that particular type of sporting event. On the other hand, another user may prefer a variety of different types of sporting events. Here, the bundled personalized user incentive could be expanded to include a plurality of different types of sporting events. That is, the media content event recommendation banner 122 may be further customized based on the user's personal preferences, habits, viewing history, and/or account information.

The overall operating environment wherein embodiments of the media content event recommendation manager 110 operate is now generally described. The media content stream 114 comprises a plurality of streamed media content events. Some media content broadcast facilities 104 simultaneously broadcast many media content events, even hundreds of broadcast media content events, in the media content stream 114. The media devices 102, when in operation, are configured by a user to select one of the plurality of simultaneously broadcast media content events for presentation on a media presentation device 116. Exemplary media presentation devices 116 include, but are not limited to, TV's, stereos, radios, surround sound systems, personal computers or the like that may be communicatively coupled to the media device 102 that is receiving the media content stream 114. In some embodiments, the media device 102 and the media presentation device 116 may be an integrated single electronic device.

In the various embodiments, the media devices 102 receive the media content stream 114 over the broadcast system 106. The media content devices 102 may be identical to, or may be substantially similar to, the media device 102. Or, the media devices 102 may be quite different from each other. Further, the media devices 102 may be coupled to different broadcast system types.

In the various embodiments, the third party provider 108 may optionally provide media to media devices 102 over the broadcast system 106. In such embodiments, the third party provider 108 provides content that is communicated to the media devices 102 via the media content stream 114. This content is communicated from the third party provider 108 to the media content broadcast facility 104 over a communication link 126.

The communication links 124, 126 may be a dedicated communication link, such as an Ethernet communication link, a fiber optic communication link, a wireless link, a cable link, or the like. In some embodiments, the communication links 124, 126 may be established through the communication system 112, or may be established through a portion of the communication system 112. The communication system 112 is illustrated as a generic communication system. In one embodiment, the communication system 112 comprises the Internet. Alternatively, or additionally, the communication system 112 may be a telephony system, a radio frequency (RF) wireless system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the remote diagnostic system 100 may be implemented on other types of communication technologies, such as but not limited to, digital subscriber loop (DSL), X.25, Internet Protocol (IP), Ethernet, Integrated Services Digital Network (ISDN) and asynchronous transfer mode (ATM). Also, the communication system 112 may be employ combination systems having a plurality of segments which employ different formats for each segment employing different technologies on each segment.

In the various embodiments, a plurality of media content events are broadcast to the media devices 102 over the broadcast system 106. Broadcasting is the communication of media content to media devices 102, in an open ended fashion. The media content is broadcast over a dispersed, open ended destination, audience wherein any particular ones of the media devices 102 may receive the broadcast media content. The media devices 102 are configured by their respective user to receive the broadcast media content via the broadcast system 106. To receive the media content, the media devices 102 are "tuned" to receive media content of interest.

An exemplary broadcast system 106 comprises a satellite broadcast system 128. One or more of the media content streams 114 reside in a transport channel 130 that is uplinked to a plurality of satellites 132, via a corresponding transmit antenna 134. The respective transport channels are then communicated, in the form of a wireless signal 136, from one or more of the satellites 132 down to a receiver antenna 138 that is communicatively coupled to the media device 102. The received wireless signal 136 (with the media content stream 114) is then communicated from the receiver antenna 138 to the media device 102. The receiver antenna 138 and the media device 102 may be configured to receive multiple wireless signals 136 from a plurality of satellites 132. The other media devices 102 and/or the media content storage device 108 may similarly receive the media content stream 114 over the satellite broadcast system 128.

Alternatively, or additionally, the plurality of media content events may be broadcasted to the media devices 102 via an over the air (OTA) system 140. For example, the media content broadcast facility 104 may be a local program provider that broadcasts media content events to the media devices 102 using a wireless signal 142. The received wireless signal 142 with the media content stream 114 is received at the receiver antenna 138, or may be received directly by a receiver (not shown) residing in the media device 102. The media devices 102 and/or the media content storage device 108 may similarly receive the media content stream 114 via OTA system 140.

Alternatively, or additionally, the plurality of media content events may be broadcasted to the media devices 102 via a cable system 144. For example, the media content broadcast facility 104 may employ a coaxial cable and/or fiber optic cable 146 that is coupled to the media device 102. The media content stream 114 is received directly by the media device 102. The media devices 102 and/or the media content storage device 108 may similarly receive the media content stream 114 over the cable system 144.

In some embodiments, the media content event recommendation manager 110 may be communicatively coupled to the media content broadcast facility 104 via the communication link 126. For example, the media content event recommendation manager 110 may configure a media content event recommendation banner 122 with a personalized user incentive based on information about an identified user and based on incentive information received from the third party provider 108. Accordingly, media content event recommendation banner information may be provided from the media content event recommendation manager 110 to the media content broadcast facility 104, which is then communicated to the particular media device 102 for presentation in the media content event recommendation banner 122. Alternatively, or additionally, the media content broadcast facility 104 may provide account information, personal information, or user subscription information to the media content event recommendation manager 110 so that a personalized media content event recommendation banner information may be generated by the media content event recommendation manager 110.

Figure 2:
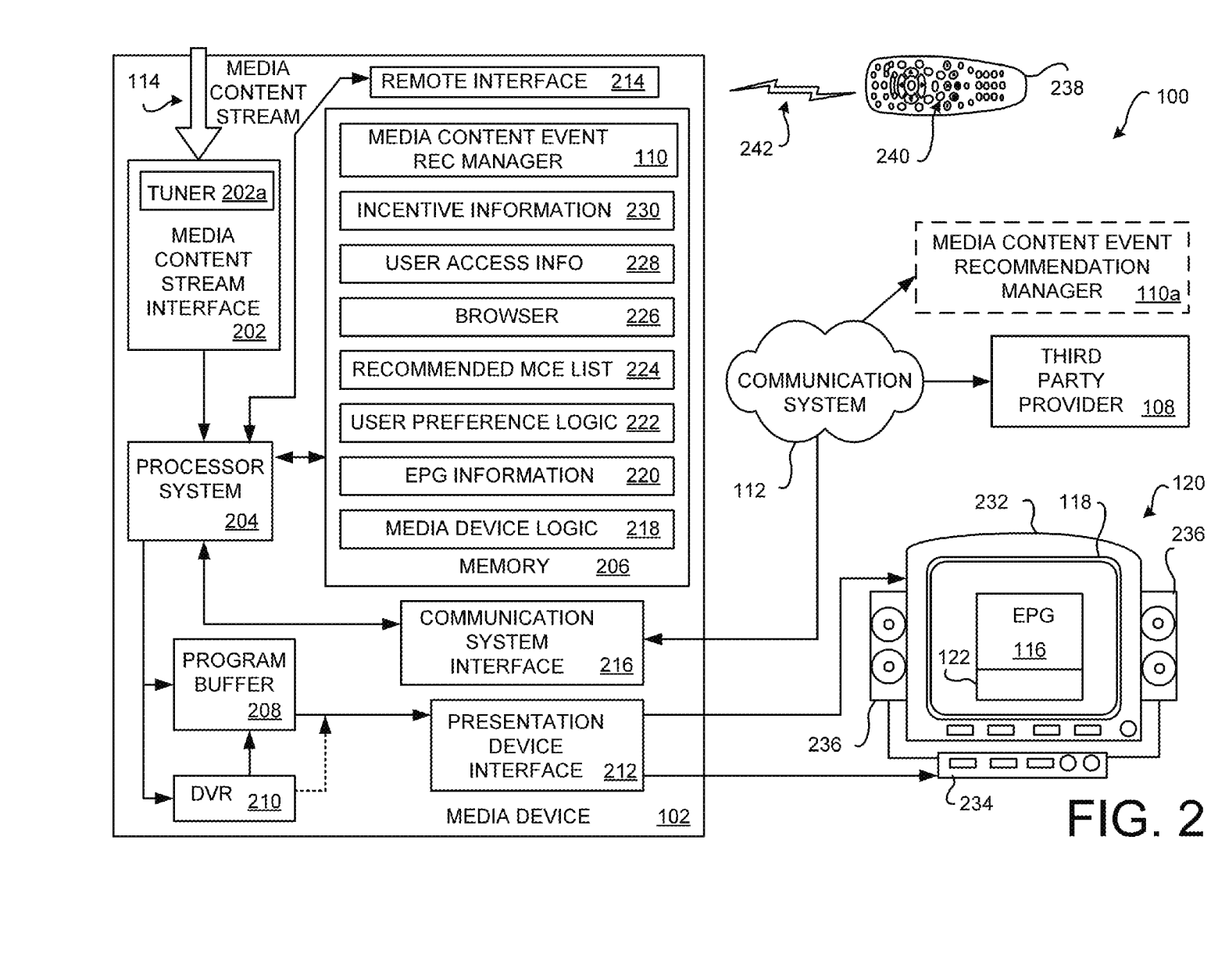
FIG. 2 is a block diagram of a media content event recommendation system implemented in a media device, such as, but not limited to, a set top box (STB)

FIG. 2 is a block diagram of a media content event recommendation system 100 implemented in a media device 102, such as, but not limited to, a set top box (STB). The non-limiting exemplary media device 102 comprises a media content stream interface 202, a processor system 204, a memory 206, a program buffer 208, an optional digital video recorder (DVR) 210, a presentation device interface 212, a remote interface 214, and an optional communication system interface 216. The memory 206 comprises portions for storing the media device logic 218, the electronic program guide (EPG) information 220, and the user preference logic 222, the media content event recommendation (REC) manager 110, a recommended media content event (MCE) list 224, an optional browser 226, optional user access information (INFO) 228, and optional incentive information 230. In some embodiments, the media device logic 218 and the user preference logic 218 may be integrated together, and/or may be integrated with other logic. In other embodiments, some or all of these memory and other data manipulation functions may be provided by and using remote server or other electronic devices suitably connected via the Internet or otherwise to a client device. Other media devices may include some, or may omit some, of the above-described media processing components. Further, additional components not described herein may be included in alternative embodiments.

The functionality of the media device 102, here a set top box, is now broadly described. A media content provider provides media content that is received in one or more multiple media content streams 114 multiplexed together in one or more transport channels. The transport channels with the media content streams 114 are communicated to the media device 102 from a media system sourced from a remote head end facility (such as the example media content broadcast facility 104, FIG. 1) operated by the media content provider. Non-limiting examples of such media systems include satellite systems 128, over the air (OTA) systems 140, cable systems 144, and/or the Internet. For example, if the media content provider provides programming via a satellite-based communication system 128, the media device 102 is configured to receive one or more broadcasted satellite signals 136 or OTA signals 142 detected by an antenna 138 (FIG. 1).

The one or more media content streams 114 are received by the media content stream interface 202. One or more tuners 202a in the media content stream interface 202 selectively tune to one of the media content streams 114 in accordance with instructions received from the processor system 204. The processor system 204, executing the media device logic 218 and based upon a request for a media content event of interest specified by a user, parses out media content associated with the media content event of interest. The media content event of interest is then assembled into a stream of video and/or audio information which may be stored by the program buffer 208 such that the media content can be streamed out to components of the media presentation system 106, such as the visual display device 114 and/or the audio presentation device 116, via the presentation device interface 212. Alternatively, or additionally, the parsed out media content may be saved into the DVR 210 for later presentation. The DVR 210 may be directly provided in, locally connected to, or remotely connected to, the media device 102. In alternative embodiments, the media content streams 114 may stored for later decompression, processing and/or decryption.

In this simplified embodiment, the presentation device interface 212 is illustrated as coupled to a media presentation system 120 that includes a visual display device 232, such as a television (hereafter, generically a TV), and an audio presentation device 234, such as a surround sound receiver (hereafter, generically, a speaker). Other types of output devices may also be coupled to the media device 102, including those providing any sort of stimuli sensible by a human being, such as temperature, vibration and the like. The video portion of the streamed media content is displayed on the display 118 and the audio portion of the streamed media content is reproduced as sounds by the speakers 236.

From time to time, information populating the EPG information 222 portion of the memory 206 is communicated to the media device 102, via the media content stream 114 or via another suitable media. The EPG information 222 portion of the memory 206 stores the EPG information pertaining to the scheduled programming. The EPG information may include, but is not limited to, a scheduled presentation start and/or end time, a program channel, and descriptive information. The program's descriptive information may include the title of the program, names of performers or actors, date of creation, and a summary describing the nature of the program. Any suitable information may be included in the program's supplemental information. Upon receipt of a command from the user requesting presentation of an EPG display, the information in the EPG information 222 is retrieved, formatted, and then presented on the display 118 as an EPG 116.

The exemplary media device 102 is configured to receive commands from a user via a remote control 238. The remote control 238 includes one or more controllers 240. The user, by actuating one or more of the controllers 240, causes the remote control 238 to generate and transmit commands, via a wireless signal 242, to the media device 102. The commands control the media device 102 and/or control the media presentation devices 128. The wireless signal 152 may be an infrared (IR) signal or a radio frequency (RF) signal that is detectable by the remote interface 214. For example, but not limited to, the commands may control presentation of information shown on the EPG 116.

The processes performed by the media device 102 relating to the processing of the received media content stream 114 and communication of a presentable media content event to the components of the media presentation system 120 are generally implemented by the processor system 204 while executing the media device logic 218. Thus, the media device 102 may perform a variety of functions related to the processing and presentation of one or more media content events received in the media content stream 114.

In media devices 102 provisioned with embodiments of the media content event recommendation system 100, the processor system 204 retrieves and executes the user preference logic 222. Characteristics associated with the available media content events are analyzed to identify and/or determine one or more media content events based on user information (preferences, habits, and/or viewing history). Thus, media content events may be identified and/or determined to be recommended media content events based on availability of particular media content events to the media device 102 and based on characteristics that match the user information (preferences, habits, and/or viewing history).

In an example embodiment, the EPG information 222 may be retrieved and searched to identify media content events that are scheduled for current or future broadcast to the media device 102. The EPG information also includes characteristics that are compared to the user information (preferences, habits, and/or viewing history). For example, the EPG information 222 includes the title of the available media content events along with other descriptive information, including a brief summary of the content theme, identification of actors, identification of set locations, identification of episode information. Further, additional supplemental information describing the media content events may be included in the EPG information 222 may be used to compare with the user information (preferences, habits, and/or viewing history). When a match is found between one or more characteristics of a particular media content event listed if the EPG information 222 and the user information (preferences, habits, and/or viewing history), then that particular available media content event may be identified as and/or determined to be a recommended media content event. Information identifying that particular recommended media content event is then stored in the recommended media content event list 224.

Additionally, or alternatively, VOD information identifying media content events that are available on demand may be include in the EPG information 222 or from an external source, such as the remote third party provider 108, another website or the like. For example, an embodiment may execute the browser 226 to access information about the availability and characteristics of available media content events that are currently available from that website. Such available VOD media content events are candidates for becoming a recommended media content event when a match is found between one or more characteristics of a particular available VOD media content event and the user information (preferences, habits, and/or viewing history). Information identifying these available VOD media content events is then stored in the recommended media content event list 224 for use in generating a media content event recommendation banner 122. The stored information may include access information that instructs the media device 102 in the particulars of assessing the available VOD media content events (website address and other connection information, access information to the VOD media content event, and/or retail or incentive cost of the VOD media content event).

As new media content becomes available, and as other media content becomes no longer available, the recommended media content events listed in the recommended media content event list 224 will change. For example, after a broadcasting of a particular listed media content event scheduled has been completed, that particular media content event may no longer be available for access by the media device 102 (assuming that the media content event is not scheduled for another future broadcast or is not available from another source, such as a VOD system or the like). As another example, another media content event may no longer be available on a VOD system or other source (and assuming that the media content event is not scheduled for a broadcast as indicated in the EPG information 220). Accordingly, these no-longer available media content events are then removed from the recommended media content event list 224.

In some embodiments, the browser 226 may be continuously used, or may be periodically used, to search one or more websites for media content event availability information that indicates which particular media contents events are available and how the media device 102 may access such available media content events. Accordingly, such no-longer available media content events are removed from the recommended media content event list 224.

Updating of the recommended media content event list 224 may occur periodically, may occur continuously, or may occur in response to one or more predefined update events. An example updating event may be initiated when new EPG information 220, or EPG information updates, are received at the media device 102. Additionally, or alternatively, an updating event may be initiated if the remote third party provider 108, another website or the like sends a message to the media device 102 (or the remote media content event recommendation manager 110a, which may then notify the media device 102) indicating that media content is newly available and/or is no longer available.

Alternatively, some embodiments may flag or otherwise identify no-longer available media content events may be as being no-longer available, but retain the identifying information of the no-longer available media content events in the recommended media content event list 224. Embodiments may then monitor new or updated EPG information, and/or may monitor the remote third party provider 108, another website or the like. If the no-longer available media content event later becomes available, the status of that particular media content event may be changed to being an available media content event. Thus, processing load is reduced since the processor system 204 does not need to repeatedly evaluate that particular no-longer available media content event to determine if there is a match with the user information (preferences, habits, and/or viewing history).

In some embodiments, the user access information 228 includes at least information that may be used to determine or identify user access rights to the media content events identified in the recommended media content event list 224. In an example embodiment, access rights information may be stored in the user access information 228. Other embodiments may store the access information in other locations.

For instance, the access information may identify or specify a level of service and/or a list of authorized premium service channels that the media device 102 is authorized to access may. Thus, if a particular media content event is currently available on an authorized premium channel, or on an authorized VOD system, operated by the third party provider 108, then that particular media content event (referred to herein as a conditionally accessible media content event) may be included in the recommended media content event list 224.

In the various embodiments, a conditionally accessible media content event may be a media content event that may become available on a premium channel, or on a VOD system. Access and/or cost information may be associated with that particular media content event. Accordingly, when the media content event recommendation banner 122 is generated, the access information and/or cost may be used to generate the associated personalized user incentive information in the presented media content event recommendation banner 122.

For example, the personalized user incentive information may indicate that the user may obtain access to a particular media content event under some specified condition, such as purchase of that particular media content event, or another product or service, offered by the third party provider 108. In other situations, the particular media content event may only be available on a premium channel that the media device is not currently authorized to access. Here, the incentive information may indicate that that the conditionally accessible media content event would become accessible by the media device 102 if the user subscribes to, or at least accepts a trial subscription to, the premium channel identified in the personalized user incentive of a media content event recommendation banner 122 presented to a user. A trial subscription is a subscription that is effective for a particular channel or particular media content event for a limited duration (limited time). Thus, such conditionally accessible media content events would be included in the recommended media content event list 224.

In the various embodiments, a media content event recommendation banner 122 includes information that identifies one or more particular media content events included in the recommended media content event list 224 that the user may be interested (based on their preferences, habits, and/or viewing history), and includes at least one personalized user incentive. On some embodiments, information used to define the personalized user incentives is stored in the incentive information 230. Accordingly, when a media content event recommendation banner 122 is presented to the user, information for defining the personalized user incentive is readily available at the media device 102 when the media content event recommendation banner 122 is generated and is presented to the user.

In an example embodiment, a user identifier is accessed from the user access information 228 or another source, and is then communicated to the third party provider 108 or another remote website, which then responds with access rights information. For example, the third party provider 108 may indicate that the media device 102 is not currently authorized to receive media content events from the VOD system that is managed by the third party provider 108. Thus, media content events that are available from that particular third party provider 108 or another remote website may be included as conditionally accessible media content event in the recommended media content event list 224. Additionally, or alternatively, the user's current access rights to various media content events may have been previously provided to the third party provider 108 or another entity. The third party provider 108 or other entity may then return one or more incentives that can then be personalized for the user of that particular media device 102. The returned incentive information may then be stored in the incentive information 230.

For example, the third party provider 108 may indicate that for a plurality of listed conditionally accessible media content events, access to one (or even more) of the conditionally accessible media content events will be authorized if the user accepts a personalized user incentive for a trial subscription to a premium channel that the user has not yet subscribed to. Then, if one of the listed conditionally accessible media content events is identified in the recommended media content event list 224, a personalized media content event recommendation banner 122 may be configured to indicate the corresponding recommended media content event (that is listed in the recommended media content event list 224 and that is identified as an eligible conditionally accessible media content event by the third party provider 108). Accordingly, the generated media content event recommendation banner 122 indicates the personalized user incentive (to accept a trial subscription).

Alternatively, or additionally, embodiments may contact the third party provider 108 at the time that the media content event recommendation banner 122 is being generated. In such embodiments, the offered personalized user incentive can be defined by the third party provider 108 based on what incentives the third party provider 108 wishes to provide at that time. For example, the price of an offered incentive made at a peak usage time (such as between 7:00 p.m. and 10:00 p.m.) may be different from a similar incentive made at an off-peak time (such as between 3:00 a.m. and 5:00 a.m.). As another example, a particular conditionally accessible media content event may be trending upward in popularity. Accordingly, the current price of the personalized user incentive might be increased as the popularity of the conditionally accessible media content event trends upward. Alternatively, if the popularity is trending downward, the current price of the conditionally accessible media content event may be reduced.

The various example processes of identifying candidate media content events for inclusion in the recommended media content event list 224, for determining and/or selection personalized user incentives, and for assessing current user access rights to identify conditionally accessible media content events, are performed by the media content event recommendation manager 110. When the media content event recommendation manager 110 resides in the media device 102, the above-described processes may be implemented by the processor system 204.

In some operating environments, a remote media content event recommendation manager 110a may be used. The remote media content event recommendation manager 110a may cooperatively operate with the media content event recommendation manager 110 residing in the media device 102. For example, the remote media content event recommendation manager 110a may coordinate incentive information with the remote third party provider 108, another website or the like. Incentive information may then be communicated form the remote media content event recommendation manager 110a to particular ones of the plurality of media devices 102.

Alternatively, or additionally, the remote media content event recommendation manager 110a may operate with media devices 102 that are not provisioned with an internal media content event recommendation manager 110. Media content event recommendation banners 122 may be generated by the remote media content event recommendation manager 110a, and then communicated to particular ones of the plurality of media devices 102. In such embodiments where the media content event recommendation manager 110a is remote from the media device 102, the media content event recommendation manager 110a is understood to have at least some components that are the same as, or are similar as, the above-described components of the media device 102 illustrated in FIG. 2.

Figure 3A:
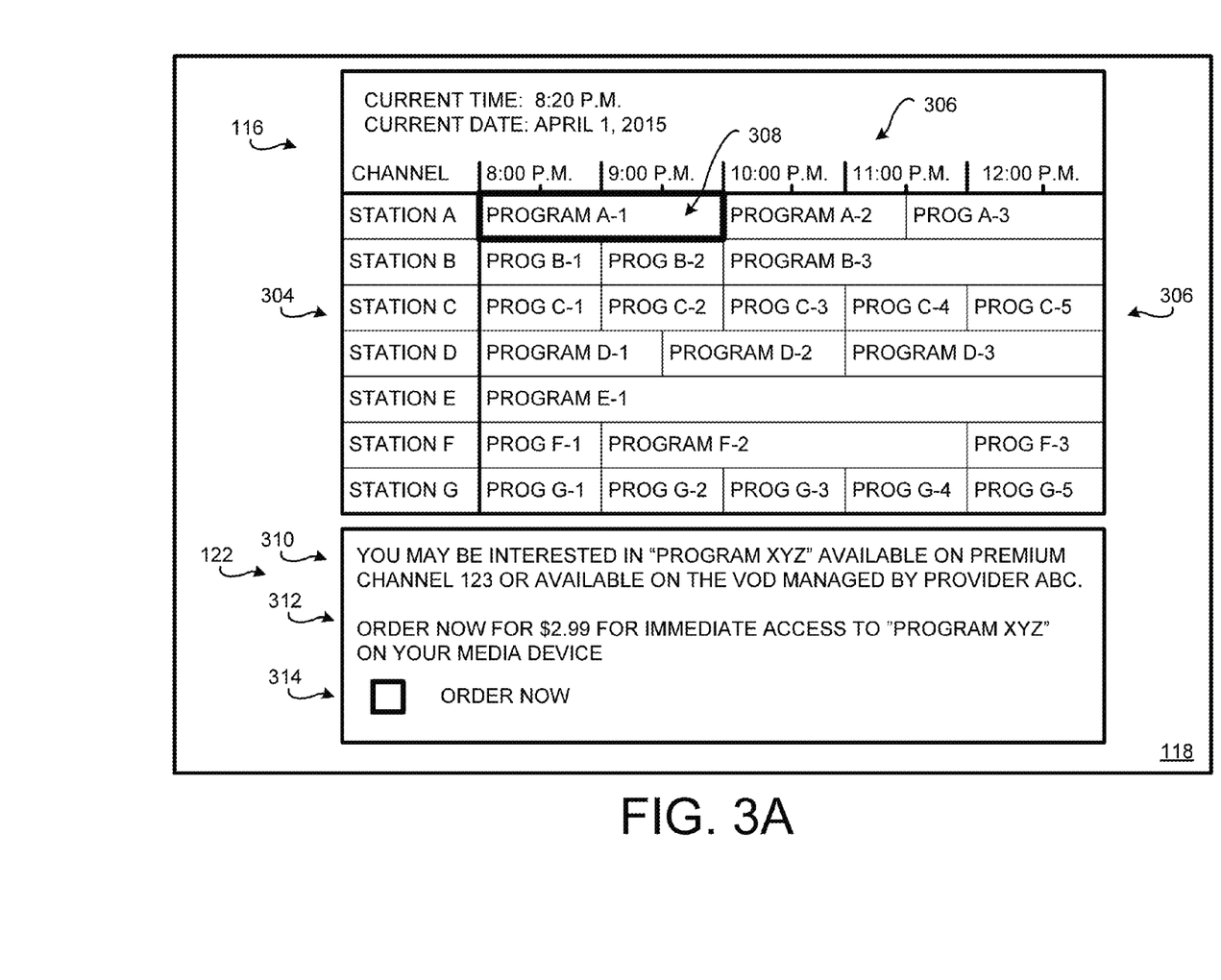
FIGS. 3A, 3B and 3C illustrate an example presented EPG and an associated media content event recommendation banner.
Figure 3B:
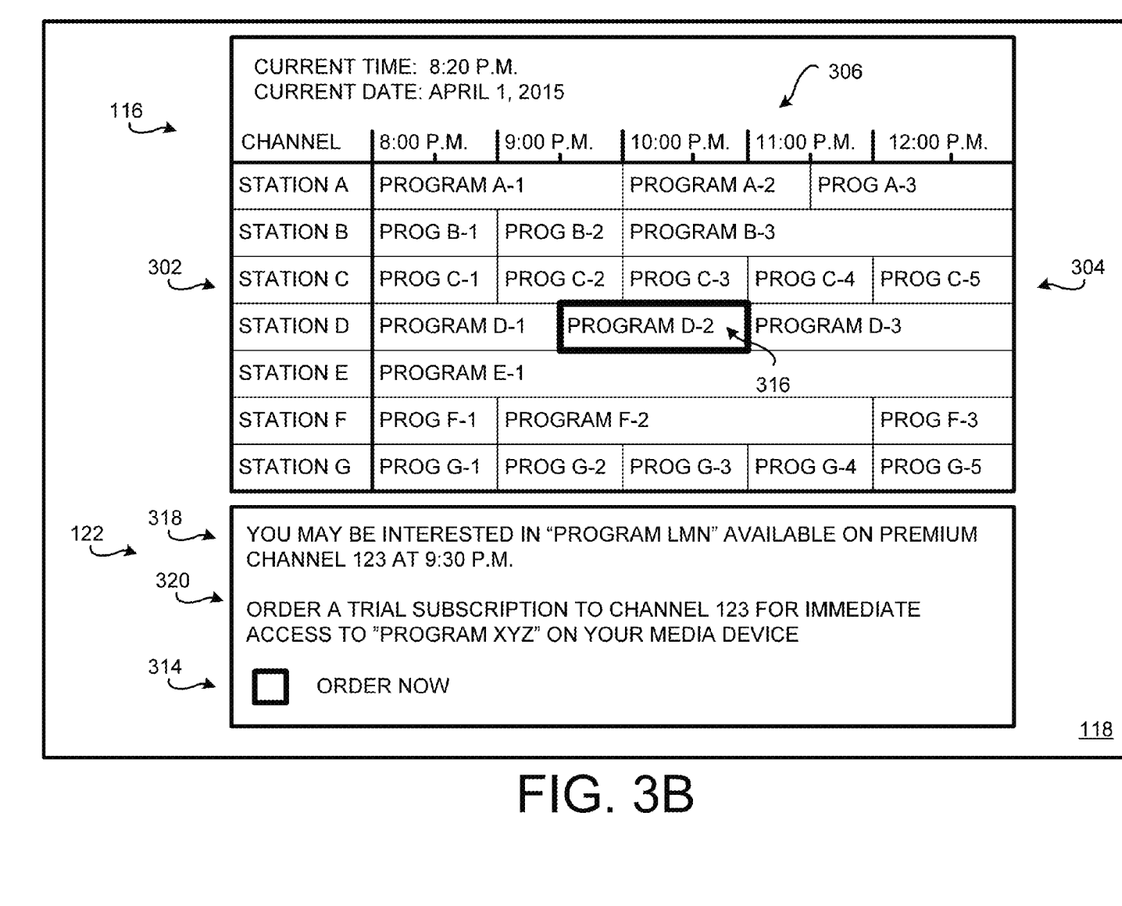
Figure 3C:
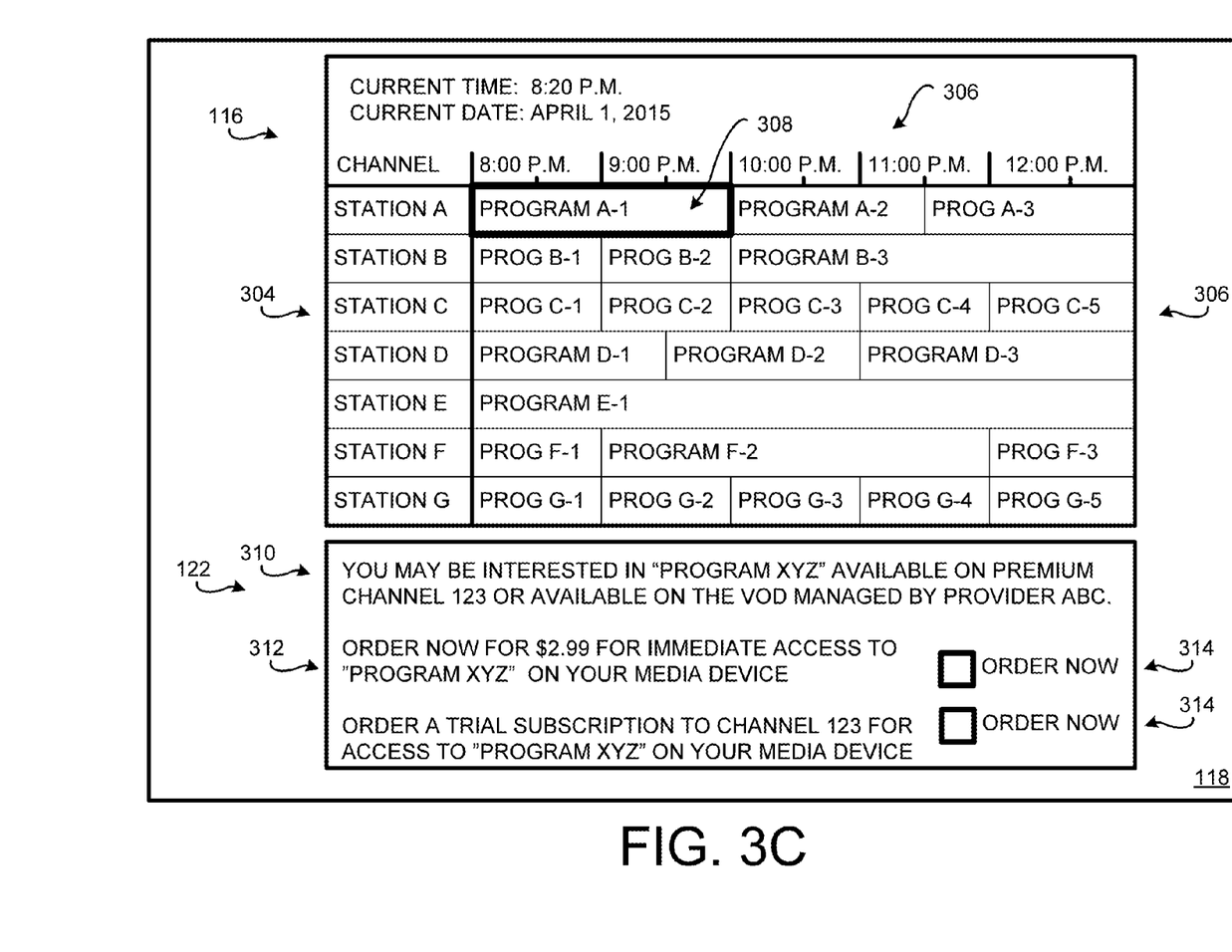

FIGS. 3A, 3B and 3C illustrate an example presented EPG 116 and an associated media content event recommendation banner 122. The EPG 116 is presented on a display 118 to assist the user to select media content events of interest for presentation and/or recording. The EPG 116 is a type of graphical user interface that presents a menu, or a series of menus, with a combination of text and symbols to represent media content event viewing choices that may be selected by the user. Typically, the EPG 116 has the look and feel of a table with information describing available media content events, interchangeably referred to herein as programs. An information portion 302 is included in the EPG 116 that shows the title of available media content events, and may include an optional brief description of the media content event. The EPG 116 has a channel indication portion 304 that indicates the "channel" of the available media content events. The channel identifies the originating source of the program, such as a television studio, a premium movie provider, a national program provider, etc. A portion 306 of the EPG 116 may indicate scheduled times and dates of the presentation of the indicated media content events.

The EPG 116 is interactive with the user. The user, by providing navigation instructions via the remote control 234 that is in communication with a media device 102, is able to "scroll" or "navigate" about the EPG 116 to select an identifier of a media content event of interest. When the viewer highlights the portion of the EPG 116 corresponding to a media content event of interest, the user may actuate one or more controllers 236 on the remote control 234 to cause the media device 102 to perform a function relative to the selected program of interest. For example, if the user has navigated to the media content event identifier "Program A-1" (as indicated by the bold-line highlighting), and that media content event associated with the identifier is scheduled to begin, or is currently available, the user may select that media content event of interest for presentation on the display 118. Alternatively, or additionally, the user may have the media device 102 record and store the media content event of interest in the DVR 210 such that the user may later view the selected media content event of interest at a more convenient later time.

An embodiment of the media content event recommendation system 100, in the simplified example illustrated in FIG. 3A, has generated the example media content event recommendation banner 122. The media content event recommendation banner 122 is concurrently presented with presentation of the EPG 116. A recommendation portion 310 of the media content event recommendation banner 122 presents at least one recommended media content event that is expected to be of interest to the user. Further, the selected recommended media content event has been selected from the recommended media content event list 224.

In the simplified example illustrated in FIG. 3A, the recommended media content event identifier ("Program XYZ") is indicated as being of potential interest to the user. The identifier "Program XYZ" is appreciated to be a conditionally accessible media content event that the media device 102 is not currently authorized to access. Additionally, source information for the indicated conditionally accessible media content event may be included in the media content event recommendation banner 122.

A personalized incentive portion 312 is included in the media content event recommendation banner 122. Here, the example personalized user incentive indicates the terms under which the user may order the recommended media content event for $2.99, which may be at a discount from a current retail price. The incentive discounted price is expected to induce the user to purchase access rights to the indicated recommended media content event.

A selection region 314 may be included on the presented media content event recommendation banner 122 to facilitate acceptance of the personalized user incentive by the user. In this simplified example, the user may navigate a cursor or scroll down to highlight the selection region 314. Upon actuation of one or more controllers 236 on the remote control 234, a wireless signal 238 is generated by the remote control 234 so that the media content event recommendation manager 110 will enable the media device 102 to access the recommended media content event. Here, a $2.99 charge is then made to the user's account or other payment instrument (credit card, debit card, or the like), and presentation of the media content event associated with the identifier "Program XYZ" is initiated.

If the user declines the personalized user incentive presented in the media content event recommendation banner 122, and instead selects the "Program A-1" as indicated in the presented EPG 116, then presentation of that selected media content event may be initiated. Presentation of the EPG 116 and the media content event recommendation banner 122 may then be concluded. (Or, if that program is being presently viewed at the time of the user's initiation of the presentation of the EPG 116, then presentation of the selected media content event resumes.)

In some situations, the user may be interested in viewing a different media content event of interest, as illustrated in FIG. 3B. In this simplified example, the user has navigated from the identifier "Program A-1" to the identifier "Program D-2" shown at region 31b of the EPG 116 (and as indicated by the bold-lining of the box around that particular media content event identifier).

In this example embodiment, information presented in the media content event recommendation banner 122 is modified. The modification of the media content event recommendation banner 122 may be based on a variety of factors.

First, it is apparent that the user is not particularly interested in accepting the original personalized user incentive 312 (FIG. 3A) since the user has not navigated down to the selection region 314 to order the recommended media content event "Program XYZ" at the incentive price of $2.99. Rather, the user has elected to navigate to the other media content event of interest shown in the EPG 116. Therefore, failure by the user to select the originally-presented personalized user incentive causes a modification to be made to the media content event recommendation banner 122.

In the simplified example of FIG. 3B, a different recommended media content event is selected from the recommended media content event list 224. Here, "Program LMN" available on the premium channel identified as "Channel 123" is indicated as being a new recommended media content event in the new recommendation portion 318. The new recommended media content event is selected based on the user's preferences, habits, and/or viewing history.

However, some embodiments may consider an additional factor in selection of the new recommended media content event. The additional factor relates to some characteristic of the program that the user has navigated to in the presented EPG 116. That is, there may be an identifiable relationship between the navigated-to media content event identifier ("Program D2") and the newly indicated recommended media content event identifier ("Program LMN"). One or more relationships between the navigated-to media content event identifier ("Program D-2") and the possible candidate recommended media content events listed in the recommended media content event list 224 may be considered in determining and selecting a particular recommended media content event that is shown in the newly presented media content event recommendation banner 122.

A first example characteristic is a temporal relationship between the navigated-to media content event ("Program D-2") and the new recommended media content event. Here, the navigated-to media content event identifier ("Program D-2") indicates that the associated media content event begins at 9:30 p.m. Accordingly, the new recommended media content event, if broadcasted to the media device 102, also begins at 9:30 p.m. Accordingly, if the user is interested in viewing options that are available at a particular time, then embodiments of the media content event recommendation manager 110 may screen the list of candidate recommended media content events based on the corresponding time of the navigated-to media content event shown on the EPG 116 to personalize the media content event recommendation banner 122 to indicate other available recommended media content events that begin at that same time. Then, the identified one or more recommended media content events may be presented in the new media content event recommendation banner 122.

Alternatively, or additionally, the descriptive information for the navigated-to media content event ("Program D-2") may indicate a theme related characteristic of that media content event. For example, the navigated-to media content event ("Program D-2") may be a science fiction themed media content event. Accordingly, assuming that the user is interested in viewing a science fiction themed media content event, then embodiments of the media content event recommendation manager 110 may screen the list of candidate recommended media content events based on the corresponding theme of the navigated-to media content event shown on the EPG 116. Then, one or more recommended media content events may be presented in the new media content event recommendation banner 122 based on a further consideration of the theme of the navigated-to media content event and the user's preferences, habits, and/or viewing history.

For example, the navigated-to media content event ("Program D-2") may be current episode of a science fiction themed media content event series. An example embodiment may recommend a different episode of the same series. Additionally, or alternatively, competing series that are similar to the navigated-to episode, or related movies, may be indicated on the presented media content event recommendation banner 122.

In some embodiments, one or more characteristics of the personalized user incentive may be optionally modified in a newly presented media content event recommendation banner 122. In the example media content event recommendation banner 122 of FIG. 3B, the user may be offered personalized incentive terms of a free trial subscription, shown n the personalized incentive portion 320, to "Channel 123" if the user wishes to watch the recommended media content event "Program LMN" at 9:30 p.m. (available on the premium "Channel 123").

Alternatively, or additionally, the modified characteristic of the personalized user incentive may be based, wholly or in part, upon past responses of the particular user to prior presented personalized user incentives. For example, if the user repeatedly has chosen to take advantage of personalized user incentives which offer a purchase of a single recommended media content event, future presented personalized user incentives may continue to formulate personalized user incentives that offer purchases of other conditionally accessible media content events that are included in the recommended media content event list 224. As another example, if the user has accepted a trial subscription from an earlier presented personalized user incentive, but did not continue the subscription after the end of the trial period, future presented personalized user incentives may be limited to offers to purchase conditionally accessible media content events that are included in the recommended media content event list 224. That is, no further trial subscriptions may be offered in future personalized user incentives. Or, if trial subscriptions are offered in future personalized user incentives, the trials may be limited to channels not already sampled by the user via previously offered trial subscriptions.

In some embodiments, the media content event recommendation banner 122 is automatically presented concurrently with the EPG 116. Additionally, or alternatively, some embodiments may permit the user to selectively be presented with the media content event recommendation banner 122. In an example embodiment, when the EPG 116 is initially presented, a pop-up window or the like may be concurrently presented with the EPG 116. The presented pop-p indicates that if selected, a media content event recommendation banner 122 with personalized user incentive information will be presented with the EPG 116. If the user navigates to and selects the pop-up, then the media content event recommendation banner 122 is concurrently presented with the EPG 116.

FIG. 3C illustrates an example EPG 116 with a media content event recommendation banner 122 that provides multiple personalized user incentives. For example, one third party provider 110a may provide the specific recommended media content event for a one-time purchase price on its VOD system, while another third party provider 110a offers the same recommended media content event on a subscriber channel. Any number of suitable personalized user incentives may be presented on a media content event recommendation banner 122.

Additionally, or alternatively, the user may pre-configure their media device to present or to omit presentation of the media content event recommendation banner 122 when the EPG 116 is presented. A suitable set-up GUI or the like can be presented to the user wherein the media content event recommendation banner 122 is optionally tuned on (activated) or turned off (deactivated).

In the various embodiments, information identifying the recommended media content events stored in the recommended media content event list 224 are associated with at least one of a users preference, habit, and/or viewing history. User preferences may be user specified, or may be determined by the media device 102. Here, a user preference is an attribute related to the subject matter of a media content event that a user has indicated as being a personal preference. For example, a generalized theme of a media content event may be a user preference. Such theme-based user preferences may include the subject matter genera of the media content event, such as science fiction, fantasy, drama, horror, history, soap-operas, action, romantic, comedy, news and current events, homemaking, cooking, etc. The preference theme may be more specific, such as to particular theme subcategories, such as a courtroom drama which is a subcategory of dramas. User preferences may be defined for other attributes of a media content event. For example, the preference may be for a particular series of media content events, a particular title, a particular actor or director, a particular geographic location, or the like.

User habits are attributes associated with repetitive viewing patterns of the user. The repetition may be based on any suitable time period, such as a weekly, daily, and/or hourly. User habits may be user specified, or may be determined by the media device 102. For example, a habit may indicate that the user may prefers newscast theme media content event in the early evenings on weekdays after work. Late at night, the user habits may indicate a preference for movies.

A user's viewing history pertains to actual media content events accessed by the user. The history may be based on any suitable time period, such as a annually, monthly, weekly, daily, and/or even hourly. For example, the user's viewing history may include an identification of the particular episodes of a series that the user has viewed during the last year. Additionally, or alternatively, the user history may indicate media content events viewed by the user over the most recent four hour period.

It should be emphasized that the above-described embodiments of the media content event recommendation system 100 are merely possible examples of implementations of the invention. Many variations and modifications may be made to the above-described embodiments. All such modifications and variations are intended to be included herein within the scope of this disclosure and protected by the following claims.

The invention claimed is:

1. A media device, comprising:
a media content stream interface configured to receive a media content stream with a plurality of serially presented media content events therein;
a memory that stores:
a recommended media content information;
wherein the recommended media content information identifies a plurality of recommended media content events,
wherein each of the identified plurality of recommended media content events are associated with user information that corresponds to at least one of a user preference for media content, a plurality of user habits of viewing media content, and user viewing history of media content, and
wherein the plurality of recommended media content events are likely to be of interest to a user; and
an electronic program guide (EPG) information;
wherein the EPG information identifies a plurality of EPG-indicated media content events that are scheduled for current or for future presentation; and
a processor system, wherein the processor system is configured to:
generate an EPG based on the EPG information, wherein the EPG is presentable on a display to the user, wherein the user has navigated to an EPG-indicated media content event identified in the EPG;
generate a media content event recommendation banner that is concurrently presentable with the presented EPG, wherein the media content event recommendation banner comprises:
at least one identifier of a recommended media content event selected from the recommended media content information, wherein the recommended media content event is not one of the plurality of EPG-indicated media content events; and
a cost of content to the user that provides access to at least the recommended media content event, where in response to a selection of the content by the user, the content becomes accessible to the media device.

2. The media device of claim 1, wherein a characteristic of a theme of the recommended media content event is related to a theme of the navigated-to EPG-indicated media content event.

3. The media device of claim 1, wherein the content that becomes accessible to the media device is the recommended media content event identified in the media content event recommendation banner, and wherein the recommended media content event is not accessible by the media device until after a selection by the user.

4. The media device of claim 1, wherein the content that becomes accessible to the media device is the recommended media content event identified in the media content event recommendation banner, wherein the selection by the user initiates a purchase of the recommended media content event, and wherein the recommended media content event is not accessible by the media device until after the selection by the user.

5. The media device of claim 1, wherein the content that becomes accessible to the media device is accessible only on a channel of content that is identified in the media content event recommendation banner, wherein the selection by the user begins a subscription to the channel, and wherein the recommended media content event is not accessible by the media device until after the selection by the user.

6. The media device of claim 1, wherein the content that becomes accessible to the user is a recommended video on demand (VOD) media content event associated with the at least one identifier presented in the media content event recommendation banner, wherein the cost indicates a price at which the user may gain access to the recommended VOD media content event, and wherein the recommended VOD media content event is not accessible by the media device until after the selection of the at least one personalized user incentive by the user.

7. The media device of claim 1,
wherein the cost is a first cost,
wherein the navigated-to EPG-indicated media content event is a first navigated-to EPG-indicated media content event,
wherein the presented media content event recommendation banner is a first media content event recommendation banner,
wherein a second media content event recommendation banner is generated by the processor system in response to a user's navigation from the first navigated-to EPG-indicated media content event to a second navigated-to EPG-indicated media content event on the presented EPG, wherein the second navigated-to EPG-indicated media content event is different from the first navigated-to EPG-indicated media content event, and
wherein the second media content event recommendation banner presents a second cost that is different from the first cost.

8. The media device of claim 1,
wherein the cost is a first cost,
wherein the media content event recommendation banner further includes a second cost that is concurrently presented with the first cost,
wherein the second cost is different from the first cost and includes access to at least one additional media content event in addition to the recommended media content event, where in response to selection of the first cost, the recommended media content event becomes accessible to the media device, and
where in response to selection of the second cost, the recommended media content event and the at least one additional media content event becomes accessible to the media device.

9. The media device of claim 1, further comprising:
a communication system interface configured to communicatively couple the media device to a third party system, and
wherein information corresponding to the cost of the recommended media content event is received from the third party system in response to a request for cost information that has been communicated from the media device to the third party system.

10. The media device of claim 1, wherein each of the identified plurality of recommended media content events are currently accessible by the media device or will be accessible by the media device within a predefined period of time.

11. A media content event recommendation method, the method comprising:
generating an electronic program guide (EPG) from EPG information,
wherein the EPG information identifies a plurality of EPG-indicated media content events that are scheduled for current or for future presentation, and
wherein the generated EPG is presentable on a display to a user;
receiving user information corresponding to navigation to one of the plurality of EPG-indicated media content events;
identifying at least one recommended media content event from a plurality of recommended media content events,
wherein the recommended media content event is not one of the plurality of EPG-indicated media content events, and
wherein each of the identified plurality of recommended media content events are associated with user information that corresponds to one of a preference of the user, a viewing habit of the user, and a viewing history of the user of a media device, and;
generating a media content event recommendation banner that is concurrently presentable with the presented EPG, wherein the media content event recommendation banner comprises:
at least one identifier of a recommended media content event selected from the recommended media content events; and
at least a cost that is for access to the recommended media content event indicated on the media content event recommendation banner,
wherein access to the recommended media content event is provided to the media device in response to a selection by the user.

12. The method of claim 11, wherein a characteristic of a theme of the recommended media content event is related to a theme of the navigated-to EPG-indicated media content event.

13. The method of claim 11, wherein the media content event recommendation banner is a first media content event recommendation banner with a first cost, the method further comprising:
presenting the EPG and the first media content event recommendation banner on the display;

receiving a wireless signal from a remote control operated by the user, wherein the received wireless signal causes navigation from a first EPG-indicated media content event identifier indicated on the EPG to a second EPG-indicated media content event identifier indicated on the EPG; and generating, after navigation to the second EPG-indicated media content event identifier, a second media content event recommendation banner that is concurrently presentable with the presented EPG, wherein the second media content event recommendation banner replaces the first media content event recommendation banner, wherein the second media content event recommendation banner comprises a second cost that is configured to be selected by the user, and wherein the second cost is different from the first cost.

14. A method performed at a media content event recommendation system, wherein the media content event recommendation system is communicatively coupled to a plurality of media devices configured to receive a media content stream broadcasted from a media content broadcast facility, comprising:

identifying a plurality of recommended media content events for a user of a media device, wherein the media device is one of the plurality of media devices, and wherein each of the identified plurality of recommended media content events are based on at least one of a user preference, a user habit, and a user viewing history for the user of the media device;

receiving information from the media device, wherein the received information identifies a navigated-to one of the EPG-indicated media content events identified in an electronic program guide (EPG) that is being presented to the user of the media device, and wherein the navigated-to EPG-indicated media content event is one of a plurality of EPG-indicated media content events that are scheduled for current or for future presentation that the user has navigated to;

identifying at least one recommended media content event from the plurality of recommended media content events for the user of the media device, wherein the recommended media content event is not one of the plurality of EPG-indicated media content events indicated in the EPG being presented by the media device, and wherein the media device does not have access to the recommended media content event;

communicating a media content event recommendation to the media device, wherein the media content event recommendation includes at least information that:

identifies the recommended media content event; and specifies cost information, wherein the cost information indicates a cost to the user for access of the recommended media content event by the media device; and wherein the media device presents a media content event recommendation banner concurrently with presentation of the EPG to the user, and wherein the media device then has access at the indicated cost to the recommended media content event identified in the media content event recommendation banner in response to a selection made by the user to pay the cost.

15. The method of claim 14, wherein a characteristic of a theme of the identified recommended media content event is related to a theme of the navigated-to EPG-indicated media content event.

16. The method of claim 14, further comprising:

communicating information to a third party provider that identifies the recommended media content event; and receiving the cost information from the third party provider.

17. The method of claim 16, wherein the information communicated to the third party provider is first information, the method further comprising:

receiving second information from the media device of the selection made by the user to pay the cost; and communicating third information to the third party provider that indicates the selection made by the user to pay the cost, wherein the third party provider provides access information to the media device such that the media device can access the recommended media content event.

18. The method of claim 16, wherein the information communicated to the third party provider is first information, the method further comprising:

receiving second information from the media device of the selection made by the user to pay the cost; and communicating third information to the third party provider that indicates the selection made by the user to pay the cost, wherein the third party provider communicates the recommended media content event to the media device.

19. The method of claim 14, wherein the cost information indicates a first cost to the user for access of the recommended media content event from a first source by the media device, wherein the cost information further indicates a second cost to the user for access of the recommended media content event from a second source by the media device, and wherein the media device presents the media content event recommendation banner indicating at least the first cost and the second cost concurrently with presentation of the EPG to the user.

20. The method of claim 14, wherein the cost information indicates a first cost to the user for access of the recommended media content event from a first source by the media device, wherein the cost information further indicates a second cost to the user for access of the recommended media content event from a second source by the media device, wherein the media device presents the media content event recommendation banner indicating at least the first cost concurrently with presentation of the EPG to the user while the navigated-to EPG-indicated media content event is being presented on the EPG, and where in response to changing from the navigated-to EPG-indicated media content event to a next navigated-to EPG-indicated media content event presented on the EPG, the media device presents a next media content event recommendation banner indicating at least the second cost concurrently with presentation of the EPG.

* * * * *